Oct. 23, 1928.

G. A. SWENDIMAN

DENTAL APPARATUS

Filed Dec. 5, 1927

INVENTOR.
GEORGE A. SWENDIMAN.

BY Francis H. Templeton

ATTORNEY.

Patented Oct. 23, 1928.

1,688,670

UNITED STATES PATENT OFFICE.

GEORGE A. SWENDIMAN, OF GRAND FORKS, NORTH DAKOTA.

DENTAL APPARATUS.

Application filed December 5, 1927. Serial No. 237,708.

This invention relates to devices for use in connection with the treatment of teeth. My invention more particularly relates to the provision of a novel matrix and novel forceps for holding the same, adapted to be applied to a tooth in the course of the process of filling a cavity therein, enabling the dental operator to quickly and easily obtain an accurate impression of a surface cavity for the purpose of making a restoration for the cavity of gold, porcelain or other filling material by the so-called indirect method, and also permitting the rapid and efficient insertion of plastic filling material by the direct method.

My forceps and matrix, with their respective gripping and curved supporting surfaces, cooperatively interfitting, are adapted to conform to any shaped tooth, large or small, bicuspid or molar, while their improved construction permits of their use in connection with surface cavities on the buccal, labial, lingual and occlusal surfaces of teeth situated in either the upper or lower jaw.

My apparatus is simple in construction, easy of manipulation, efficient in operation, made of durable material, of few parts, strong but light in weight and occupying relatively small space while in or out of use.

Various other objects and advantages of this invention will be obvious from the following particular description of embodiments of my invention.

The various features of novelty which characterize my invention are pointed out with particularity in the claims, annexed to and forming a part of this specification, but for a better understanding of the invention, however, its advantages and specific objects attained with its use, reference should be had to the accompanying drawings and descriptive matter in which I have illustrated and described the best forms of my invention.

Of the drawings:

Fig. 1 is a side elevation of my improved forceps.

Fig. 2 is a plan view of the same.

Fig. 3 is a side elevation of the gripping end of my forceps with jaws slightly separated to grip my improved matrix, indicated by dotted lines.

Fig. 4 is a view of my forceps and matrix showing one manner of their use in connection with a tooth.

Figs. 5 and 6, are side elevation and plan views, respectively, of my improved matrix.

Figs. 7, 8 and 9 are views of one modification of the gripping end of my forceps.

Fig. 10 is an end view of the gripping portion of the forceps of Fig. 2.

Figs. 11 and 12 are views of another modification of the gripping end of my forceps.

Figs. 13 and 14 are, respectively, side and front elevations of a modification of my forceps, and a matrix gripped thereby.

Referring to the drawings, the forceps handles 1 and 2, formed with cooperating, interengageable ratchet tooth members $1^a$ and $2^a$ and with finger holds 3 and 4, and pivoted together at 5, have curved extensions forming jaws 6 and 7, provided respectively with gripping wings 8 and 9, adapted to be opened and closed by and move in the same plane with the handles 1 and 2. In the construction illustrated, the wings 8 and 9 are shown formed integral with the shanks of the jaws 6 and 7, but the wings may be separate members and may be secured to the jaws in any suitable manner and furthermore, the wings may be readily detachable to permit substitution of different wings on the same forceps handles.

In the position shown in Fig. 4, the wings 8 and 9 have their outer ends curved or rounded convexly, as at 10 and 11, but their faces 12 and 13 are curved concavely, in the arc of a circle or otherwise as desired, and the opposite faces 14 and 15 are likewise curved concavely, in the arc of a circle or otherwise as desired, thus making the inner contacting ends 16 and 17 of the same length but of less width than the outer ends 10 and 11, so that the wings 8 and 9 in closed position resemble somewhat the shape of a double concave lens. The inner contacting ends 16 and 17 preferably have flat, rectangularly shaped gripping surfaces, but may be convexly or concavely curved, and may be of any shape in addition to the rectangular, just mentioned. With the curved configuration of the faces, above described, each of the opposite sides of the wings conforms to the shape of a tooth 18, in which a cavity 19 is adapted to receive impression material 20, supported on a matrix, hereinafter described. Nib-like points $8^a$ and $9^a$ project below and preferably are integral with wings 8 and 9 to aid them in gripping. It is obvious that faces 12, 13 may have the same curvature or a greater or less curvature than the faces 14, 15 and also that wings 8 and 9 may be either symmetrical or non-symmetrical, with their curved surfaces 12 and 14 having the same or greater or less arch than the respective curved surfaces 13 and 15.

It is to be understood that the gripping jaws and wings are to be made in various lengths and widths. For example, the form shown in Figs. 7 to 9 inclusive is specially adapted for bicuspids and anterior teeth, the dimensions of the wings being larger than those in the form shown in Figs. 11 to 12 inclusive, which is specially adapted for molars, while the form shown in Fig. 1, being of a size intermediate those of Figs. 11 and 7, is universally applicable. In Figs. 7, 8 and 9, the parts designated by reference numerals 6″, 7″, 8″, 9″, 8ᵃ″, 9ᵃ″, 10″, 11″, 12″, 13″, 14″, 15″, 16″, 17″, and in Figs. 11 and 12, the parts designated by reference numerals 6′, 7′, 8′, 9′, 8ᵃ′, 9ᵃ′, 14′, 15′, 16′, 17′ are respectively similar, differing only in dimensions from those parts in Figs. 1, 2, 3 and 4 designated by the same reference numerals, but with primes omitted.

In Figs. 13 and 14, illustrating a modification of my forceps, handles 1‴ and 2‴, pivoted together at 5‴ have straight extensions forming jaws 6‴ and 7‴ provided at their outer ends with gripping wings 8‴ and 9‴, having ends 10‴ and 11‴, faces 12‴ and 13‴, sides 12ᵃ and 13ᵃ, and faces 14‴ and 15‴, curved concavely similar to faces 12 to 15 inclusive in Figs. 1 to 12 inclusive. The inner gripping ends or edges of the wings are indicated by 16‴ and 17‴.

As illustrated in the drawings, the faces 12‴ and 13‴ are plane surfaces and sides 12ᵃ and 13ᵃ are substantially parallel to each other, but such faces and sides may be curved or have any suitable configuration. As shown in Fig. 13, the jaws 6‴ and 7‴ are integral with and merge into the faces 12‴ and 13‴ of the wings, but it is obvious that these jaws may be separate members, rigidly or detachably or adjustably secured in any suitable manner to the faces 12‴ and 13‴, or to the sides 12ᵃ and 13ᵃ or to any other portions of the wings, while the concave surface 14‴, 15‴ may be positioned at substantially right angles or at various other angles with respect to jaws 6‴ and 7‴, which may be straight extensions of the handles 1‴ and 2‴ or may be curved or bent in any manner, and be of any dimensions, as desired.

The matrix 30 comprises a relatively small strip, preferably celluloid or thin sheet metal, of various gauges of copper, tin, steel or any other suitable material, having curved wings or end portions 31 and 32 and having a portion intermediate the ends thereof folded or pinched together or doubled up to form an outwardly projecting rib or fin, having sides or legs 33 and 34, either in contact with or slightly spaced from each other, and adapted to be engaged by the gripping edges 16 and 17 of the forceps, heretofore described.

As illustrated in the drawings, this fin or rib 33, 34 is formed substantially at the center of the matrix, but it is obvious that it may be located at any point intermediate the ends of the matrix, and may project outwardly from the matrix any desired distance, and also may be co-extensive with or shorter than the width of the matrix.

At suitably spaced points in the matrix, caret-shaped slits are formed, to provide prongs or carets 35 and 36 to be bent upwardly so as to project a sufficient distance to hold material, such as plastic impression material 20, shown in Fig. 4, for example. The number of prongs or carets may be varied, either increased or decreased as desired. The matrix, which may be made of any suitable material, is intended to be manufactured and furnished in different shapes and sizes, but is adapted to be readily cut and bent as desired by the operator, in the event of there being no matrix convenient at hand which exactly fulfills the requirements of any particular case.

Referring to Fig. 4, illustrating one manner of use of my invention, the matrix 30 is shown in cooperating relation with my forceps and with a tooth to be treated. The rib or fin surfaces 33 and 34 of the matrix are engaged by the gripping ends 16 and 17, respectively, of the forceps, while the curved wings 31 and 32 of the matrix conform to and have their convex sides in contact with the curved wing surfaces 14 and 15, respectively, of the forceps, so that the matrix is securely gripped and rigidly supported by the forceps, with the prongs 35 and 36 holding the impression material 20 in desired position in the cavity 19 of the tooth 18, while the concave side of the curved wing surfaces 14 and 15 conforms to the outer surface of the tooth 18. In this connection it is to be noted that if, instead of tooth 20 shown in Fig. 4, a smaller or bicuspid tooth were to be treated, then a smaller, differently sized matrix might be used or the matrix shown in Fig. 4 might be trimmed down and bent to conform to the different contour of the smaller tooth being treated, and correspondingly with such change in matrix, the operator might substitute the modified form of wings shown in Figs. 11 and 12 in place of the form shown in Figs. 1 and 3. Similarly, of course, for a very large molar, a still differently sized and contoured matrix might be required along with the modified form of forceps shown in Figs. 7 and 8, but the form of forceps wings shown in Figs. 1 and 3 is intended for general use as adapted for the average tooth.

It is clear that the nib-like points 8ª and 9ª assist in the gripping, not only when the matrix fin can be easily engaged by the entire surfaces 16 and 17, as in Fig. 3, but also when the position of the matrix is such as to make it difficult to be gripped by any portion of the forceps except the extreme nib-like points 8ª and 9ª.

It is obvious that the forceps could be reversed so that the matrix would contact with the forceps wing surfaces 12 and 13 instead of with the forceps wing surfaces 14 and 15, as in Fig. 4, if, because of the position of the tooth in the lower or upper jaw or because of the location of the cavity on the buccal, labial, lingual or occlusal surface of the tooth undergoing treatment, or for any other reason it would be convenient or desirable to do so.

Having described the construction of my invention, I shall now outline two of the ways in which application may be made thereof, and the method which I consider preferable to follow in each case.

First, to get an accurate impression of the cavity on all surfaces of the tooth which are not proximal surfaces, I take the matrix as shown in Fig. 5 and trim it so that it will overlap the margins of the cavity about two millimeters, more or less, and shape it with the aid of scissors or any suitable instrument, in case the matrix as manufactured is not of the proper contour. I then place the matrix in the forceps, making sure that the wings of the matrix rest against the wings of the gripping end of the forceps. I then heat up some compound or any molding material and place it on the matrix, the molding material being engaged by the prongs. I force the molding material into the cavity of the tooth and allow it to harden by chilling it or by the chemical action that takes place in some molding materials. After it has become hardened I form a die of cement, Kryptex, synthetic porcelain or silver amalgam, by pressing it on the impression that has been formed on the matrix, and from this die the filling material or restoration is made.

Second, to put in silver amalgam, porcelain and synthetic fillings or any plastic filling material in the surfaces described before, I first take the matrix and see that it contours with the shape of the tooth in which the cavity exists. I then place the matrix in the wings of the forceps, making sure that the surface of the wing portions of the matrix lies against the curved face portions of the forceps wings, and I then take an impression of the surface of the tooth that has the cavity to be filled or restored with the filling. I then cut out any projections that show in the impression. After this has been done I prepare the cavity in the tooth on the surface in which it exists as it should be prepared, and then mixing the amalgam, cement, synthetic porcelain or Kryptex I place that in the cavity and exert pressure over the filling material and against the tooth, with the impression of surface of tooth previously obtained by the use of the matrix and forceps holder, thus forcing the filling material into all parts of the cavity. However, it should be said that in the case of cement or synthetic porcelains I use a celluloid strip instead of the metal matrix.

Thus, it will be seen that I have invented apparatus, which is of general application, permitting of the selection of variously shaped and sized matrix and matrix holding forceps, to satisfy the widely varying requirements of everyday use, and which is capable of being differently positioned and co-related in the interest of convenience and to meet the usual and unusual situations arising in dental practice, while the cooperating, interfitting gripping and curved supporting surfaces of my matrix and forceps provide simple, strong and efficient means for use generally in connection with the treatment of teeth and especially with the filling of the same.

While in accordance with the provisions of the statutes I have illustrated and described the best embodiments of my invention now known to me, it will be apparent to those skilled in the art that changes may be made in the subject matter and form of the invention disclosed without departing from the spirit of my invention as set forth in the appended claims, and that in some cases certain features of my invention may be used to advantage without a corresponding use of other features.

I claim:

1. A thin, ductile matrix consisting of two ring portions, a narrow portion to be gripped, and a plurality of elevated carets in the wing portions, said matrix being formed of a single piece of material.

2. A dental matrix for use in filling a tooth comprising a one-piece strip provided with means for being gripped, and a member integral with and struck up from said strip to project above the surface of said strip for holding material for taking an impression of said tooth.

3. A dental matrix comprising a one piece strip having a portion intermediate the ends thereof pinched together to form a fin for being gripped, said ends forming curved wing portions.

4. A dental matrix comprising a strip having a portion thereof pinched together to form a rib having legs extending from the surface of said strip, and curved wing portions integral with said legs, said wing portions being curved away from said rib.

5. Apparatus of the character described comprising a strip having a portion folded to form a fin extending from the surface of said strip, and curved wing portions integral with said fin and adapted to conform to the surface contour of a tooth, said wing portions being curved away from said fin.

6. In a dental matrix the combination with a strip having curved wing portions, of a fin formed integral with said strip intermediate the ends thereof, and prongs integral with and struck up from said wing portions to hold plastic material in contact therewith, said wing portions being curved away from said fin.

7. Forceps for use in filling a tooth comprising pivoted handles, having curved extensions forming jaws provided with integral gripping wings, adapted to be opened and closed by and moved in the same plane with said handles, said wings having their side faces concavely curved to conform to the shape of said tooth, and also having opposed inner faces movable towards each other to grip an article therebetween.

8. In forceps the combination with pivoted jaws, of wings having their faces concavely curved to receive a matrix, said wings being provided with means for positively gripping a portion of said matrix therebetween.

9. An instrument of the class described, comprising a pair of pivoted members provided with gripping wings, each of said wings having a curved face portion and a gripping portion, said curved face portion forming a concavely curved surface to receive a similarly curved surface of a member gripped by said gripping portions.

10. Forceps for holding a curved dental matrix provided with a fin, comprising pivoted members provided with gripping wings, each of said wings having a curved face portion and a gripping portion, said curved face portion forming a concavely curved surface to receive the curved surface of said matrix with said fin held by said gripping portions.

11. In a dental appliance, the combination with pivoted jaws, of wings integral therewith, having opposed gripping end faces, each of said wings having a curved side face, the curved side face of one wing together with the curved face of the other wing forming a concavely curved surface adapted to receive a similarly curved member held by said gripping end faces.

12. Forceps for dental work, comprising pivoted jaws adapted to be opened and closed, wings integral therewith, each of said wings having its opposite faces curved and having opposed edges for gripping an article therebetween, said wings being of substantially concave lens shape, when said jaws are in closed position.

13. In dental apparatus, a matrix, comprising a strip having a portion thereof pinched together to form a rib having legs extending from the surface of said strip, and curved wing portions integral with said legs, said matrix adapted to be gripped by forceps comprising pivoted jaws provided with wings having opposed gripping end faces, and concavely curved side faces to receive said wing portions while said rib is engaged by said gripping end faces.

14. Dental apparatus comprising forceps for holding a matrix having wing portions and an integral, outwardly projecting rib intermediate the ends of said matrix, said forceps comprising pivoted jaws provided with wings having means for gripping said rib, said wings also having faces curved to receive said wing portions.

GEORGE A. SWENDIMAN.